(12) United States Patent
Kubota et al.

(10) Patent No.: US 8,881,188 B2
(45) Date of Patent: Nov. 4, 2014

(54) ADVERTISEMENT PROVIDING SYSTEM, ADVERTISEMENT DISPLAYING APPARATUS, ADVERTISEMENT MANAGING APPARATUS, ADVERTISEMENT DISPLAYING METHOD, ADVERTISEMENT MANAGING METHOD, AND COMPUTER PRODUCT

(75) Inventors: Kazumi Kubota, Kawasaki (JP); Hirohisa Naito, Kawasaki (JP); Takahiro Kii, Kawasaki (JP); Akira Miyazaki, Kawasaki (JP); Toru Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 926 days.

(21) Appl. No.: 12/604,785

(22) Filed: Oct. 23, 2009

(65) Prior Publication Data

US 2010/0050201 A1 Feb. 25, 2010

Related U.S. Application Data

(63) Continuation of application No. PCT/JP2007/059839, filed on May 14, 2007.

(51) Int. Cl.
*H04H 60/33* (2008.01)
*G06Q 30/02* (2012.01)

(52) U.S. Cl.
CPC ............ *G06Q 30/02* (2013.01); *G06Q 30/0273* (2013.01); *G06Q 30/0246* (2013.01)
USPC .............. 725/12; 725/32; 725/42; 705/14.37; 705/14.45; 705/14.55

(58) Field of Classification Search
USPC ........ 725/12, 32, 42; 705/14.37, 14.45, 14.55
See application file for complete search history.

(56) References Cited

U.S. PATENT DOCUMENTS

| | | | |
|---|---|---|---|
| 7,010,293 B2* | 3/2006 | Go | 455/414.3 |
| 2003/0060897 A1* | 3/2003 | Matsuyama et al. | 700/1 |
| 2004/0054577 A1 | 3/2004 | Inoue et al. | |
| 2004/0117827 A1* | 6/2004 | Karaoguz et al. | 725/42 |
| 2004/0204238 A1 | 10/2004 | Aoki | |
| 2010/0007601 A1* | 1/2010 | Lashina et al. | 345/156 |
| 2011/0145066 A1* | 6/2011 | Law et al. | 705/14.54 |
| 2013/0297411 A1* | 11/2013 | van Datta et al. | 705/14.45 |
| 2014/0019249 A1* | 1/2014 | Nicholas et al. | 705/14.58 |

FOREIGN PATENT DOCUMENTS

| | | |
|---|---|---|
| JP | 9-73484 | 3/1997 |
| JP | 2001-76007 | 3/2001 |
| JP | 2002-203177 | 7/2002 |
| JP | 2004-186791 | 7/2004 |

(Continued)

OTHER PUBLICATIONS

New Technology (1) Large-Screen Interaction System "UBWALL", Fujitsu Journal, vol. 32, No. 4, 2006, No. 289 (5 pp.).
New Technology (2) Large-Screen Interaction System "UBWALL", Fujitsu Journal, vol. 32, No. 4, 2006, No. 289 (3 pp.), p. 1 lines 4-6.

(Continued)

*Primary Examiner* — Nnenna Ekpo
(74) *Attorney, Agent, or Firm* — Staas & Halsey LLP

(57) ABSTRACT

An advertisement providing system includes a storage unit storing advertisements; a pull-type display managing unit that displays an advertisement designated by a viewer, a counting unit that counts the frequency an advertisement is displayed, a generating unit that generates a display schedule for the advertisements based on the frequency the advertisements are displayed, and a push-type display managing unit that displays the advertisements according to the display schedule.

20 Claims, 10 Drawing Sheets

110

| AD-VER-TISE-MENT | DISPLAY FREQUENCY | | ADVER-TISE-MENT EFFEC-TIVE-NESS POINTS | CONTRACT CONTENTS | | SHARE RATIO | ACTUAL ADVER-TISEMENT CHARGE (YEN) | CON-TRACT FUL-FILL-MENT RATIO | PEN-ALTY CHARGE (YEN) |
|---|---|---|---|---|---|---|---|---|---|
| | PUSH-TYPE | | | ESTIMATED ADVER-TISEMENT CHARGE (YEN) | MINIMUM GUARANTEED DISPLAY FREQUENCY (PUSH-TYPE/FULL) | | | | |
| | FULL | RE-DUCED | PULL-TYPE | | | | | | |
| A | 25 | 20 | 40 | 470 | 10000 | 30 | 16 % | 20800 | 83 % | 3536 |
| B | 25 | 20 | 8 | 150 | 10000 | 30 | 5 % | 6500 | 83 % | 1105 |
| C | 25 | 20 | 2 | 90 | 10000 | 30 | 3 % | 3900 | 83 % | 663 |
| D | 50 | 40 | 12 | 260 | 10000 | 30 | 9 % | 11700 | 167 % | - |
| E | 50 | 40 | 10 | 240 | 10000 | 30 | 8 % | 10400 | 167 % | - |
| F | 50 | 40 | 7 | 210 | 20000 | 60 | 7 % | 9100 | 83 % | 1547 |
| G | 75 | 60 | 31 | 520 | 20000 | 60 | 18 % | 23400 | 125 % | - |
| H | 75 | 60 | 1 | 310 | 20000 | 60 | 11 % | 14300 | 125 % | - |
| I | 75 | 60 | 47 | 680 | 20000 | 60 | 23 % | 29900 | 125 % | - |

(56) References Cited

FOREIGN PATENT DOCUMENTS

| JP | 2004-298469 | 10/2004 |
| JP | 2004-326746 | 11/2004 |
| JP | 2006-12149 | 1/2006 |
| JP | 2007-109265 | 4/2007 |

OTHER PUBLICATIONS

Ozaki, T. et al., Interaction System Using Large Display: UBWALL, Fujitsu 57, 3, pp. 314-319, May 2006 (8 pp.), p. 316 right col. lines 13-23.

International Preliminary Report on Patentability, mailed Dec. 3, 2009, in corresponding International Application No. PCT/JP2007/059839 (16 pp.)

New Technology (2) Large-Screen Interaction System "UBWALL", Fujitsu Journal, vol. 32, No. 4, 2006, No. 289 (3 pp.)

Ozaki, T. et al., Interaction System Using Large Display: UBWALL, Fujitsu 57, 3, pp. 314-319, May 2006 (8 pp.)

International Search Report (Form PCT/ISA/210), mailed Aug. 14, 2007, in corresponding International Application No. PCT/JP2007/059839 (5 pp.)

Form PCT/ISA/220, mailed Aug. 14, 2007, in corresponding International Application No. PCT/JP2007/059839 (1 pg.)

Form PCT/ISA/237, mailed Aug. 14, 2007, in corresponding International Application No. PCT/JP2007/059839 (5 pp.)

Japanese Office Action issued Sep. 18, 2012 in corresponding Japanese Patent Application No. 2009-513934.

\* cited by examiner

FIG.4

| AD-VER-TISE-MENT | DISPLAY FREQUENCY | | | ADVER-TISE-MENT EFFEC-TIVE-NESS POINTS | CONTRACT CONTENTS | | SHARE RATIO | ACTUAL ADVER-TISEMENT CHARGE (YEN) | CON-TRACT FUL-FILL-MENT RATIO | PEN-ALTY CHARGE (YEN) |
|---|---|---|---|---|---|---|---|---|---|---|
| | PUSH-TYPE | | PULL-TYPE | | ESTIMATED ADVER-TISEMENT CHARGE (YEN) | MINIMUM GUARANTEED DISPLAY FREQUENCY (PUSH-TYPE/FULL) | | | | |
| | FULL | RE-DUCED | | | | | | | | |
| A | 25 | 20 | 40 | 470 | 10000 | 30 | 16 % | 20800 | 83 % | 3536 |
| B | 25 | 20 | 8 | 150 | 10000 | 30 | 5 % | 6500 | 83 % | 1105 |
| C | 25 | 20 | 2 | 90 | 10000 | 30 | 3 % | 3900 | 83 % | 663 |
| D | 50 | 40 | 12 | 260 | 10000 | 30 | 9 % | 11700 | 167 % | - |
| E | 50 | 40 | 10 | 240 | 10000 | 30 | 8 % | 10400 | 167 % | - |
| F | 50 | 40 | 7 | 210 | 20000 | 60 | 7 % | 9100 | 83 % | 1547 |
| G | 75 | 60 | 31 | 520 | 20000 | 60 | 18 % | 23400 | 125 % | - |
| H | 75 | 60 | 1 | 310 | 20000 | 60 | 11 % | 14300 | 125 % | - |
| I | 75 | 60 | 47 | 680 | 20000 | 60 | 23 % | 29900 | 125 % | - |

| LAYOUT | WEIGHT FACTOR |
|---|---|
| PUSH-TYPE (FULL) | w1=2 |
| PUSH-TYPE (REDUCED) | w2=1 |
| PULL-TYPE | w3=10 |

ADVERTISEMENT PROVIDING SYSTEM, ADVERTISEMENT DISPLAYING APPARATUS, ADVERTISEMENT MANAGING APPARATUS, ADVERTISEMENT DISPLAYING METHOD, ADVERTISEMENT MANAGING METHOD, AND COMPUTER PRODUCT

This application is a continuation application, filed under 35 U.S.C. §111(a), of International Application No. PCT/JP2007/059839, filed May 14, 2007, the disclosure of which is herein incorporated in its entirety by reference.

FIELD

The embodiments discussed herein are related to a system, apparatuses and methods for providing and displaying advertisements.

BACKGROUND

Conventionally, advertisements include a push-type advertisement and a pull-type advertisement. A push-type advertisement is an advertisement that is presented by an advertisement provider (advertiser) to a viewer. A TV commercial message is an instance of a push-type advertisement. A pull-type advertisement is an advertisement that is presented by an advertisement provider at the request of the viewer. For example, Web page information that is accessed by specifying a Web site URL is an instance of a pull-type advertisement.

Push-type and pull-type advertisements are handled separately through different media. Correlation between push-type and pull-types advertisement, therefore, has been carried out through advertising agency operations. For example, in search-engine-tied advertisements, a specific method is adopted, by which a push-type advertisement is run in the form of a TV commercial, the details of which are uploaded to the Web site.

A link between the push-type advertisement and the pull-type advertisement is provided only when an advertisement viewer records link information attached to the push-type advertisement (see, e.g., Japanese Patent Application Laid-Open Publication Nos. 2001-76007 and 2004-186791).

An advertisement displaying apparatus has thus been disclosed that executes a push-type display process of displaying a group of advertisements selected from among advertisements according to a display schedule for the group of advertisements and a pull-type display process of switching over to display an advertisement specified by a viewer (see, e.g., Fujitsu Journal, April 2006, New Technology (1), [Online], [searched on May 8, 2007], Internet <URL: http://jp.fujitsu.com/about/journal/289/newtechnology/>). This advertisement displaying apparatus is provided in public places such as stations, airports, and shopping centers, and displays information concerning nearby stores, airport guide maps, etc. on the screen.

According to the above conventional techniques, however, switchover from the push-type display process to the pull-type display process is performed by the viewer, and in some cases, the viewer does not know or has forgotten how to perform the switchover operation.

In the push-type display process, layout for displaying larger characters and images is inevitably adopted to enable a viewer at a distance from the display screen to see the text and images. In such a case, however, the viewer comes to have difficulty in viewing the text and images when approaching the screen, thereby making it necessary for the approaching viewer to switchover to the pull-type display process. Consequently, a problem arises in that the viewer has to switchover to the pull-type display process, which in terms of retrieving detailed information of an advertisement of interest to the viewer, takes time and effort.

The viewer may view advertisements other than the advertisement of interest or as a result of cumbersome operation, may terminate operation, resulting in a lost advertising opportunity. Further, if the viewer executes unnecessary operations and consequently remains in front of the advertisement displaying apparatus, no push-type advertisement is displayed thereby resulting in a lost advertising opportunity to reach many viewers.

In the pull-type display process, since no advertisement is displayed until specified by the viewer, heavy reliance on the push-type display process alone leads to a decline in overall display frequency. In such a case, since the advertiser reaps no benefit in terms of effectiveness with respect to cost, the advertiser determines that the advertising effectiveness is poor, thus comes to purchase fewer advertisements, bringing about a profitability problem. Determining whether the advertisement is cost effective is difficult and poses a problem in terms of the reliability of the effectiveness of the advertising.

SUMMARY

According to an aspect of an embodiment, an advertisement providing system includes a storage unit storing plural advertisements; a pull-type display managing unit that displays on a display, an advertisement designated by a viewer, from among the advertisements; a counting unit that counts, for each of the advertisements, frequency of display on the display; a generating unit that, based on the frequency of display for each of the advertisements, generates a display schedule for the advertisements; and a push-type display managing unit that displays the advertisements on the display, according to the display schedule.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram of contents of a database (DB);

FIG. 5 is an explanatory diagram of a weight table;

DESCRIPTION OF EMBODIMENTS

Preferred embodiments of the present invention will be explained with reference to the accompanying drawings.

Figure 1:
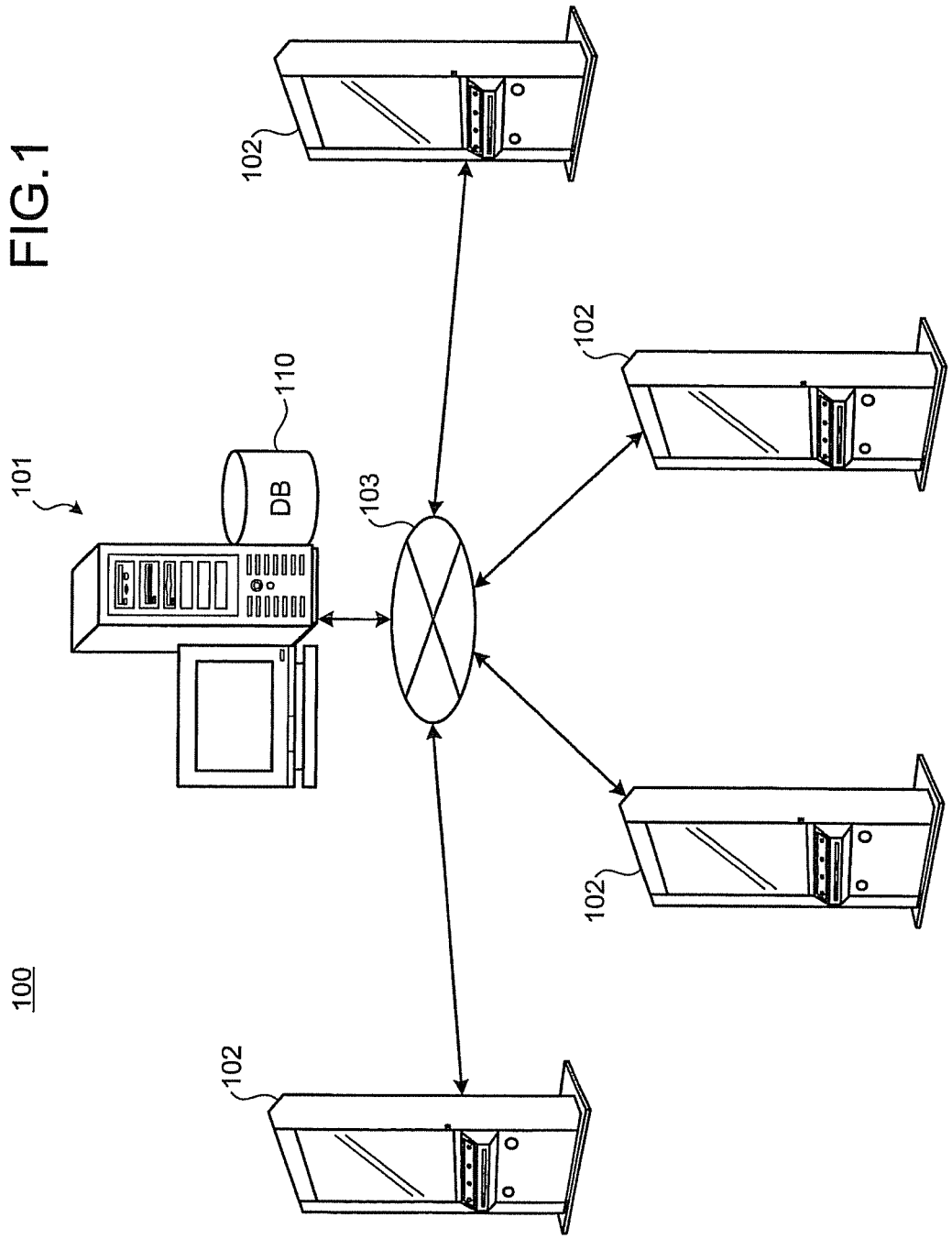
FIG. 1 is a schematic of an advertisement providing system according to an embodiment.

FIG. 1 is a schematic of an advertisement providing system 100 according to an embodiment. The advertisement providing system 100 depicted in FIG. 1 includes an advertisement managing apparatus 101 and advertisement displaying apparatuses 102 that are connected communicatively via a network 103, such as a local area network (LAN), a wide area network (WAN), and the Internet.

The advertisement managing apparatus 101 functions as a server that manages the advertisement displaying apparatuses 102. The advertisement managing apparatus 101 distributes a display schedule to the advertisement displaying apparatuses 102, and has a DB 110 that stores therein data for managing the advertisement displaying apparatuses 102. The advertisement displaying apparatuses 102 are disposed in places enabling close contact with consumers, such as airports, stations, stores, and streets. The advertisement displaying apparatuses 102 each receive a display schedule from the advertisement managing apparatus 101 and display advertisements according to the display schedule.

In this advertisement providing system 100, among advertisement data stored in the DB 110, advertisement data for a group of advertisements in the display schedule is distributed together with the display schedule from the advertisement managing apparatus 101. Each advertisement displaying apparatus 102 thus displays the distributed advertisement data according to the display schedule.

The advertisement data may be stored in advance in an internal memory area (memory or HD) of each advertisement displaying apparatus 102. In this case, upon receiving a display schedule distributed from the advertisement managing apparatus 101, the advertisement displaying apparatus 102 calls up advertisement data for a group of advertisements in the display schedule from the memory area according to the display schedule and displays the advertisement data.

The advertisement managing apparatus 101 may be configured to distribute advertisement data to all advertisement displaying apparatuses 102 each time the advertisement data is updated. In any case, storage of advertisement data to the advertisement displaying apparatus 102 by a point in time just prior to display of the advertisement data by the advertisement displaying apparatus 102 suffices.

Figure 2:
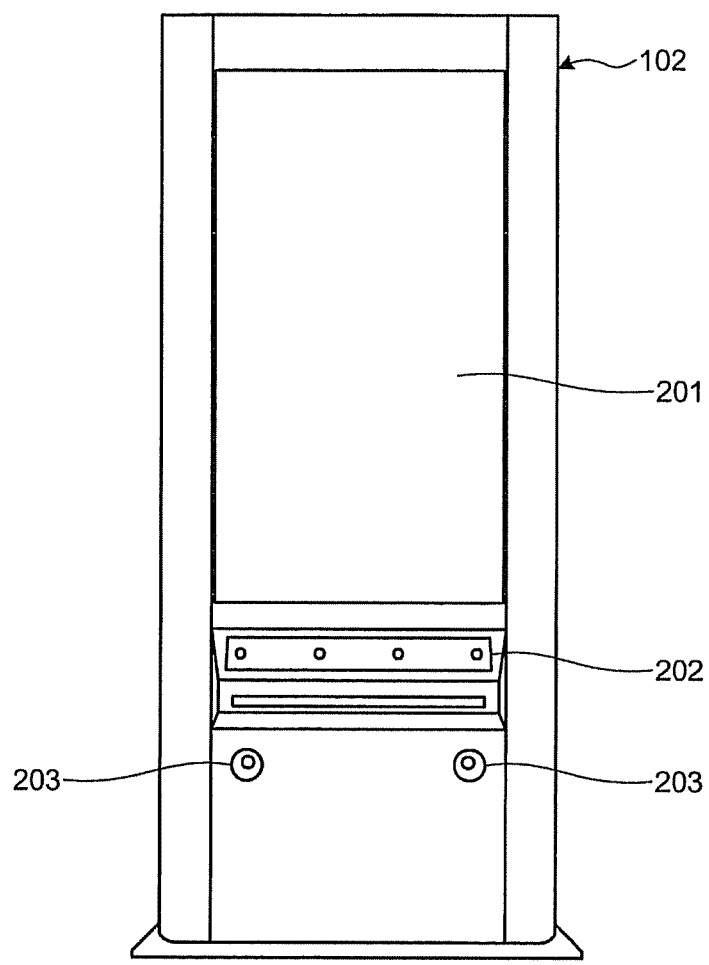
FIG. 2 is a front view of an advertisement displaying apparatus.

FIG. 2 is a front view of the advertisement displaying apparatus 102. The advertisement displaying apparatus 102 includes a display 201 with a large screen, a sensor 202, and a speaker 203. On the display 201, image data or moving picture data of an advertisement (hereinafter "advertisement data") is displayed. The advertisement displaying apparatus 102 executes a push-type display process of displaying a selected group of advertisements according to a display schedule for the group of advertisements. As a result, an advertisement may be displayed using virtually the entire area of the display 201.

The sensor 202 is configured by, for example, an infrared sensor. Upon detecting a person, the sensor 202 displays a list of images for reduced advertisements enabling a viewer to specify a reduced advertisement. When an arbitrary reduced advertisement is specified from among the list of reduced advertisements, a pull-type display process is executed to switchover to display of the specified advertisement. The speaker 203 outputs voice guidance, audio content of the advertisement and instructions for operating the advertisement displaying apparatus. When the advertisement displaying apparatus 102 is provided as a stand-alone apparatus, the advertisement displaying apparatus 102 is provided with all functions of the advertisement managing apparatus 101.

Figure 3:
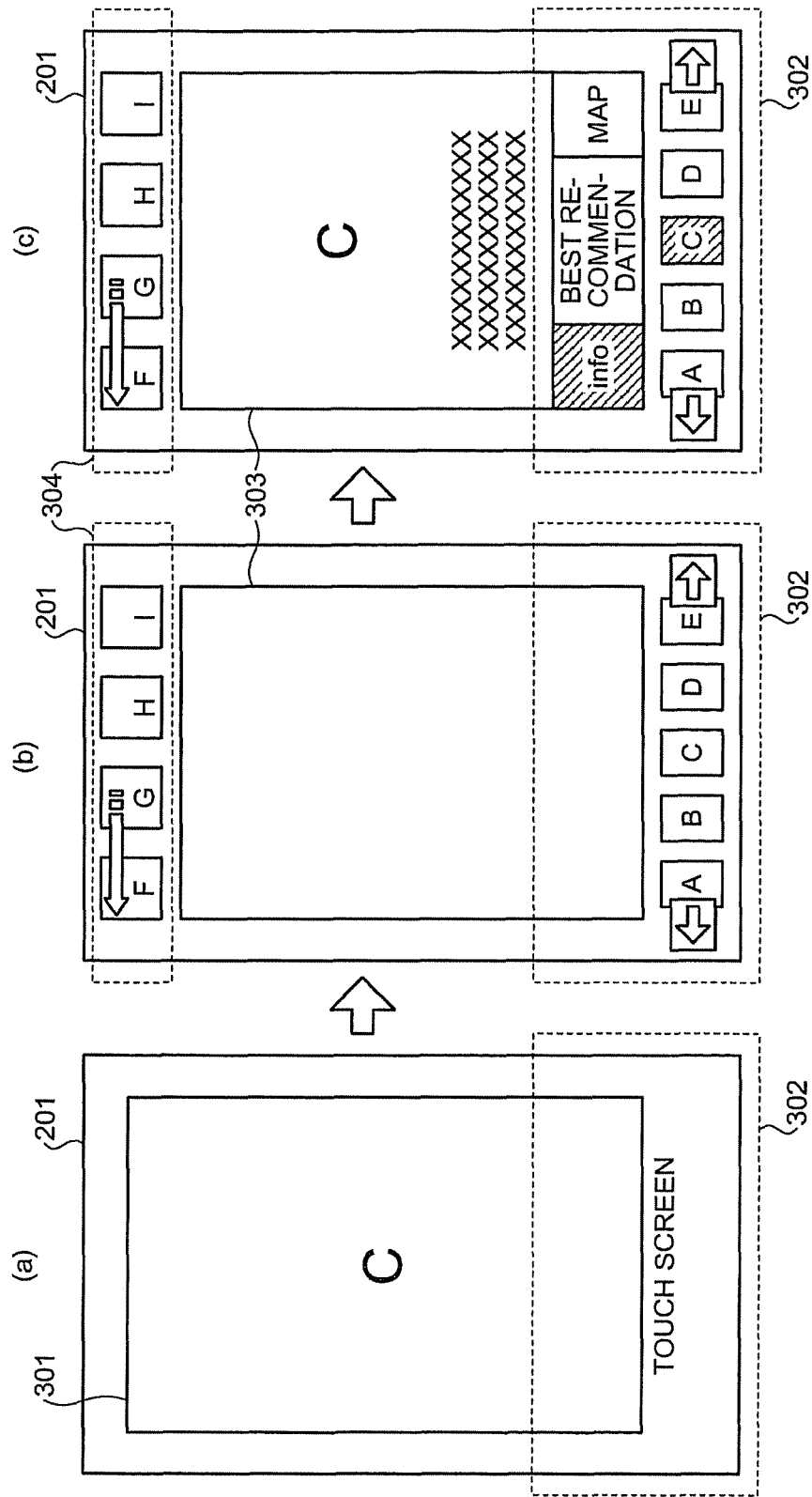
FIG. 3 is an explanatory diagram of screen transition on a display of the advertisement displaying apparatus.

FIG. 3 is an explanatory diagram of screen transition on the display 201 of the advertisement displaying apparatus 102. In FIG. 3, advertisements as a whole include advertisements A to I, advertisement display candidates are advertisements A to E, and the display schedule for the advertisement display candidates is "A→B→C→D→E". At the advertisement displaying apparatus 102, the advertisements A to E are displayed periodically in sequence according to this display schedule.

Section (a) of FIG. 3 depicts the push-type display process. A state of display by the push-type display process is called "advertisement display mode". In the layout during the advertisement display mode, reference numeral 301 denotes a push-type full display area 301. In the push-type full display area 301, substantially the entire area of the display 201 is used to enable a viewer at a distance from the display 201 to easily see the advertisement, and the push-type display according to the display schedule is executed, i.e., the advertisements A to E are displayed in sequence in the push-type full display area. In the state depicted in section (a), the advertisement C is being displayed by the push-type display process.

A dotted line denoted by reference numeral 302 demarcates a touch-panel operation area, in which the viewer who has come to be facing the display touches the screen to execute a given operation. During the push-type display process, a character string prompting the viewer, such as "touch the screen", is displayed in the operation area 302. If the sensor 202 detects a person during the push-type display process depicted in section (a), the state depicted in section (a) changes to the state depicted in section (b) of FIG. 3.

Section (b) depicts a layout during a nonoperational state in a guidance panel mode. Reference numeral 303 denotes a pull-type display area, in which advertisement data of an advertisement specified by the viewer is displayed. In the operation area 302, thumbnail images of the advertisements A to E on the display schedule are displayed in the order defined by the display schedule and are on stand by to be specified by the viewer.

A thumbnail image of the advertisement being displayed in the push-type full display area 301 at the time of detection of a person by the sensor 202 is disposed at the center of the series of thumbnail images. In the layout depicted in section (b), a thumbnail image of the advertisement C is disposed at the center.

In this manner, the thumbnail of the advertisement C displayed on the display 201 by the push-type display process at the time of detection of the viewer is displayed at a position more distinctive than the positions of other advertisements A, B, D, and E. However, configuration is not limited hereto and the thumbnail of the advertisement C displayed on the display 201 by the push-type display process at the time of detection of the viewer may be displayed in a more emphasized state than that of the other advertisements A, B, D, and E.

When a viewer, who is at a distance from the advertisement displaying apparatus 102, is attracted to the advertisement C in the push-type full display area 301 and approaches the advertisement displaying apparatus 102, the viewer is detected by the sensor 202. When the viewer comes to stand in front of the advertisement displaying apparatus 102, the thumbnail image of the advertisement C in which the viewer is interested, is placed at the center of the operation area 302 to facilitate specification of the advertisement. Thus, the advertisement displaying apparatus 102 is handy for a viewer who is unaccustomed to and rarely uses the advertisement displaying apparatus 102, thereby enabling the viewer to immediately extract information of interest (push information).

With the thumbnail image of the advertisement C, which is being displayed on the display 201 at the time of detection by the sensor 202, located at the center, thumbnail images of advertisements A and B, which had been displayed before the detection, are displayed in descending alphabetical order on the left side of the thumbnail image of the advertisement C and thumbnail images of advertisements D and E to be displayed following the advertisement C are displayed on the right side.

Reference numeral 304 denotes a push-type reduced display area. In the push-type reduced display area 304, thumbnail images of advertisements F to I not included in the display schedule are displayed. In the state depicted in section (b), the pull-type display area 303 may be kept in a nondisplay state until an advertisement is specified in the operation area 302, and a notice encouraging operation of the operation area 302 may be displayed in the pull-type display area 303.

When the viewer is in front of the advertisement displaying apparatus 102, the body of the viewer typically overlaps the pull-type display area 303, which prevents other viewers at a distance from the advertisement displaying apparatus 102 from clearly seeing the advertisement. For this reason, the push-type reduced display area 304 is located above the upper half of the pull-type display area 303 to simultaneously achieve pull-type display and push-type display.

Section (c) of FIG. 3 depicts layout during an operational state in the guidance panel mode. In the layout depicted in section (c), the thumbnail image of the advertisement C is emphasized to indicate that the thumbnail image of the advertisement C has been specified. When the thumbnail image of an advertisement in the operation area 302 is specified, detailed advertisement data of the specified advertisement is displayed in the pull-type display area 303.

The lower edge area of the pull-type display area 303 overlaps the operation area 302. A switching operation image for switching detailed information on advertisements is displayed in this lower edge area to enable the viewer to switch the detailed information by switching operation. In the layout depicted in section (c), the detailed information includes information ("info" in FIG. 3), recommended information ("Best Recommendation" in FIG. 3), and map information ("Map" in FIG. 3), any one of which may be specified as detailed information.

FIG. 4 is an explanatory diagram of the contents of the DB 110. As depicted in FIG. 4, the DB 110 stores therein, for each advertisement, information concerning display frequency, an advertisement effectiveness point, contract contents, a share ratio, an actual advertisement charge, a contract fulfillment ratio, and a penalty charge, the information being updated as necessary.

Display frequency is information indicative of the rate of appearance of an advertisement (advertisement data), and can be expressed as the number of times of display or a display period. The display frequency will hereinafter be described as the number of times of display. The display frequency is counted separately for each of the push-type full display area 301, the push-type reduced display area 304, and the pull-type display area 303. An advertisement effectiveness point is information indicative of the effectiveness of an advertisement in the form of a numerical value, and is calculated based on the display frequency or may be regarded as the display frequency itself.

Contract contents is numerical value information that is set based on a contract for advertisement display, and includes an estimated advertisement charge and a minimum guaranteed display frequency. An estimated advertisement charge is an estimate of an advertisement charge for a given period. A minimum guaranteed display frequency is the lowest display frequency that is guaranteed if the advertiser pays the estimated advertisement charge. In FIG. 4, for example, a display frequency in the push-type full display area 301 is presented as the minimum guaranteed display frequency.

A share ratio is a ratio for calculating the actual advertisement charge and is calculated, for each advertisement, according to equation 1.

$$\text{Share ratio} = \text{advertisement effectiveness point/sum of advertisement effectiveness points of all advertisements} \quad (1)$$

An actual advertisement charge is the advertisement charge actually paid by a sponsor and is calculated, for each advertisement, according to equation 2.

$$\text{Actual advertisement charge} = (\text{estimated advertisement charge/sum of estimated advertisement charges for all advertisements}) \times \text{share ratio} \quad (2)$$

A contract fulfillment ratio is a ratio that indicates whether contract contents are fulfilled. A contract fulfillment ratio of 100% or higher indicates fulfillment of the contract contents. The contract fulfillment ratio is calculated, for each advertisement, according to equation 3.

$$\text{Contract fulfillment ratio} = \text{display frequency in push-type full display area/minimum guaranteed display frequency} \quad (3)$$

The minimum guaranteed display frequency given as the denominator is guaranteed as the display frequency in the push-type full display area 301, so that the display frequency given as the numerator is also the display frequency in the push-type full display area 301. If the minimum guaranteed display frequency as the denominator is guaranteed as the display frequency in the pull-type display area 303, the display frequency given as the numerator is also the display frequency in the pull-type full display area 303.

A penalty charge is a charge that is returned to an advertiser when the contract fulfillment ratio is less than 100% and is calculated, for each advertisement, according to equation 4. No penalty charge is calculated for an advertisement with the contract fulfillment ratio of 100% or more.

$$\text{Penalty charge} = \text{actual advertisement charge} \times (1 - \text{contract fulfillment ratio}) \quad (4)$$

FIG. 5 is an explanatory diagram of a weight table. The weight table 500 is stored in the DB 110. A weight factor on the weight table 500 is set for each advertisement display layout (the size of a display area and a distance from a specific position on the display 201), and is used for calculation of advertisement effectiveness points. Various types of the weight factor are set for the push-type display process according to the type of layout.

As depicted in FIG. 5, a weight factor $W1=2$ is set for a display frequency in the push-type full display area 301, a weight factor $W2=1$ is set for a display frequency in the push-type reduced display area 304, and a weight factor $W3=10$ is set for a display frequency in the pull-type full display area 303. Each display frequency corresponding to each of the weight factors $W1$ to $W3$ is weighted with (multiplied by) the corresponding weight factor. For example, an advertisement effectiveness point of the advertisement A is calculated by the following equation.

$$\text{advertisement effectiveness point of advertisement } A = 25 \times w1 + 20 \times w2 + 40 \times w3 = 25 \times 2 + 20 \times 1 + 40 \times 10 = 470$$

If a display frequency is to be excluded from the display frequencies from which an advertisement effectiveness point is calculated, a weight factor for the display frequency to be excluded is set to "0". For example, if only the display frequency in the pull-type display area 303 is to be used for calculation, the weight factors W1 and w2 for other display frequencies are both set to "0". As a result, an advertisement effectiveness point to be calculated is in fact the advertisement effectiveness point calculated from only the display frequency in the pull-type display area 303.

Figure 6:
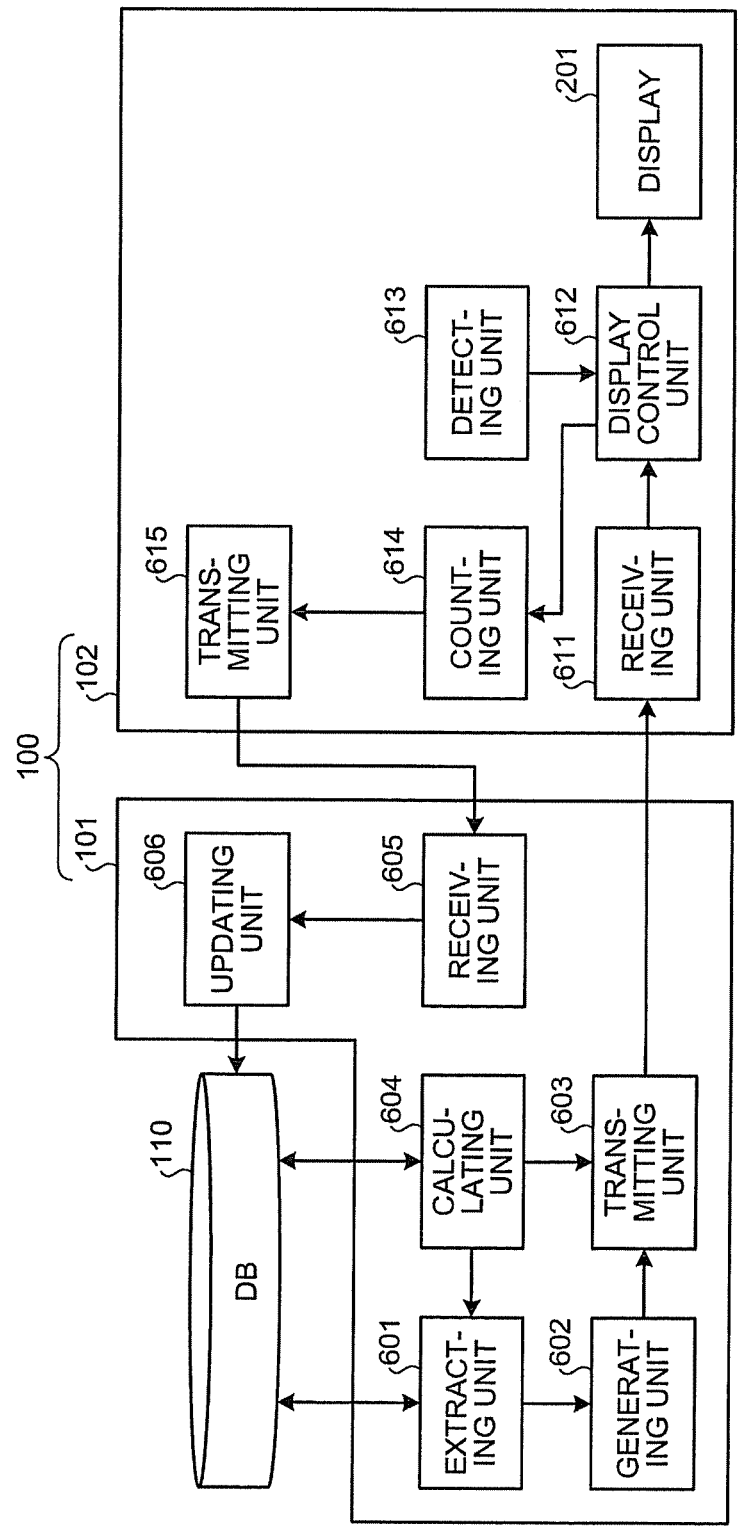
FIG. 6 is a block diagram of a functional configuration of the advertisement providing system according to the embodiment.

FIG. 6 is a block diagram of a functional configuration of the advertisement providing system 100 according to the embodiment.

With reference to FIG. 6, a functional configuration of the advertisement managing apparatus 101 of the advertisement providing system 100 will be described. The advertisement managing apparatus 101 includes an extracting unit 601, a generating unit 602, a transmitting unit 603, a calculating unit 604, a receiving unit 605, and an updating unit 606. Functions of the functional units 601 to 606 are implemented by an execution of a program by a CPU or operation of an I/F, the program being stored in a storage area such as the memory and an HD.

The extracting unit 601 has a function of extracting a group of advertisements as advertisement display candidates, the group of advertisements being selected from among advertisements based on the display frequency of each advertisement by the pull-type display process. Specifically, the extracting unit 601 extracts, from among advertisements and as advertisement display candidates, a group of advertisements having display frequencies equal to or lower than a given display frequency.

A display frequency serving as a given reference display frequency may be any one of a display frequency in the push-type full display area 301, a display frequency in the push-type reduced display area 304, and a display frequency in the pull-type display area 303. If a display frequency in the pull-type display area 303 is adopted as the given display frequency to extract, as advertisement display candidates, a group of advertisements having frequencies equal to or lower than the given display frequency, it means that an advertisement not called up actively by a viewer is extracted as an advertisement display candidate.

In this manner, an advertisement having a lower display frequency in the pull-type display area 303 is preferentially included among advertisement display candidates, thereby increasing opportunities for the advertisement to be displayed as a push-type advertisement. As a result, advertisement display frequencies as a whole are leveled out. When advertisements are arranged in increasing order of display frequency, a group of advertisements arranged in order up to a given place may be extracted as advertisement display candidates. In this manner, in addition to absolute evaluation based on the given frequency, relative evaluation based on the increasing order of display frequencies is also applicable.

A group of advertisements that are selected not based on display frequencies but on the above advertisement effectiveness points may be extracted as advertisement display candidates. When plural advertisements are arranged in the increasing order of advertisement effectiveness points, a group of advertisements arranged in order up to a given place may be extracted as advertisement display candidates.

A group of advertisements that are selected from among advertisements based on the minimum guaranteed display frequencies of the advertisements may be extracted as advertisement display candidates. Specifically, when an advertisement having a display frequency less than a minimum guaranteed display frequency is present among advertisements not included in a group of advertisements that are extracted as advertisement display candidates, an advertisement selected from among the group of advertisements is replaced with the advertisement having a display frequency less than the minimum guaranteed display frequency. The group of advertisements resulting from advertisement replacement is then extracted again as advertisement display candidates.

With reference to FIG. 4, for example, when the given reference frequency is "20" (which is equivalent to a case of the top 6 in increasing order), advertisements B to F and H are extracted as advertisement display candidates. At this time, the display frequency of the advertisement A in the push-type full display area 301 is "25", which does not satisfy the minimum guaranteed display frequency of the advertisement A. Because of this, an advertisement selected from among the advertisements D to F and H, which satisfy respective minimum guaranteed display frequencies, is replaced with the advertisement A. As a result, advertisements as a whole are adjusted in display frequency to have display frequencies equal to or more than respective minimum guaranteed display frequencies.

In this case, an advertisement to be replaced with the advertisement A may be selected randomly from among the advertisements D, E, and H. An advertisement with a high display frequency in the pull-type display area 303 may be replaced preferentially. Among the advertisements D, E, and H, the advertisements D and E having high display frequencies in the pull-type display area 303 and the advertisements D, E, and H satisfying the minimum guaranteed display frequency "30" are preferably replaced.

The generating unit 602 has a function of generating a display schedule for the group of advertisements extracted by the extracting unit 601 as advertisement display candidates. When plural advertisement displaying apparatuses 102 are provided, an identical display schedule may be made for all advertisement displaying apparatuses 102, or a different display schedule may be made for each of the advertisement displaying apparatuses 102.

Figure 7:
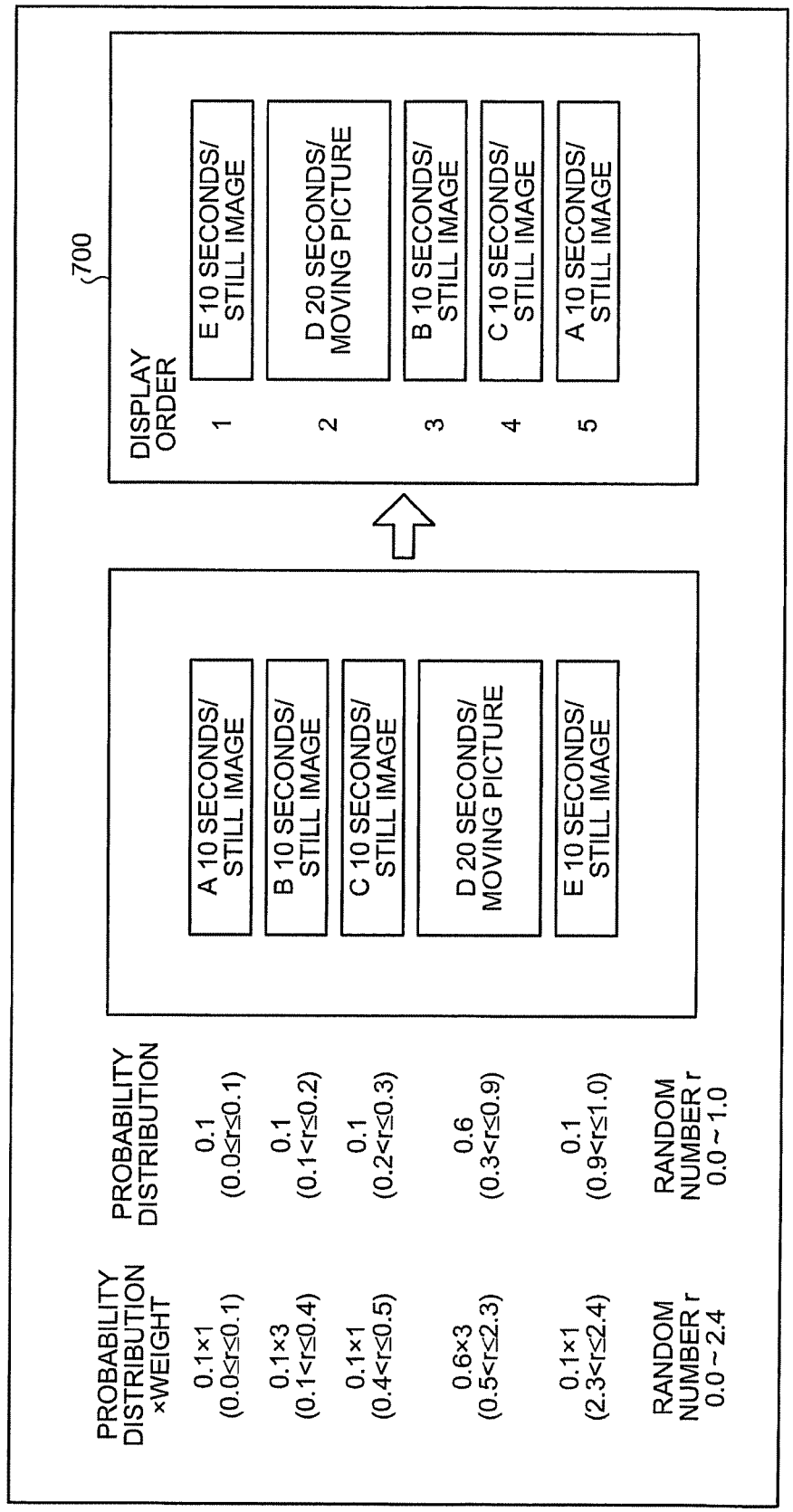
FIG. 7 is an explanatory diagram of an example of display schedule generation.

FIG. 7 is an explanatory diagram of an example of display schedule generation. As depicted in FIG. 7, the advertisements A to E selected as advertisement display candidates are rearranged randomly to make an advertisement schedule 700.

Advertisement arrangement may be carried out in such a way that a probability distribution is assigned to each of advertisements as random numbers r sequentially generated and such that an advertisement corresponding to a random number r that has appeared, is selected to arrange the advertisements in the order of selection. For example, a probability distribution of 0.1 is assigned to the advertisements A to C and E, and a probability distribution of 0.6 is assigned to the advertisement D. As a result, the advertisement A is selected when the random number r is $0.0 \leq r \leq 0.1$, the advertisement B is selected when the random number r is $0.1 < r \leq 0.2$, the advertisement C is selected when the random number r is $0.2 < r \leq 0.3$, the advertisement D is selected when the random number r is $0.3 < r \leq 0.9$, and the advertisement E is selected when the random number r is $0.9 < r \leq 1.0$.

Advertisement arrangement may be carried out in such a way that a probability distribution assigned to each of the advertisements is weighted with a weight factor as random numbers r are sequentially generated and such that an advertisement corresponding to a random number r that has appeared is selected to arrange the advertisements in the order of selection. For example, a weight factor of 0.1 is added to the advertisements A, C, and E, and a weight factor of 0.3 is added to the advertisements B and D. As a result, the advertisement A is selected when the random number r is $0.0 \leq r \leq 0.1$, the advertisement B is selected when the random number r is $0.1 < r \leq 0.4$, the advertisement C is selected when the random number r is $0.4 < r \leq 0.5$, the advertisement D is selected when the random number r is $0.5 < r \leq 2.3$, and the advertisement E is selected when the random number r is $2.3 < r \leq 2.4$.

The generating unit 602 may generate a display schedule by setting a display order based on the display frequencies of advertisement display candidates. Specifically, the generating unit 602 may generate the display schedule by sorting the advertisement display candidates in increasing order of display frequency in the pull-type display area 303.

In the example depicted in FIG. 7, a display period is set in advance for each advertisement. This display period may be set based on the display frequency of each advertisement display candidate. Specifically, when the advertisement display candidates are sorted in increasing order of display frequency in the pull-type display area 303, the display period is set so that the display period for an advertisement higher in the order becomes longer. For example, if the advertisement display candidates A to E of FIG. 7 are sorted in increasing order of display frequency in the pull-type display area 303, the resulting arrangement is "C→B→E→D→A". Hence, the display period is set so that a display period for the advertisement C is the longest while the same for the advertisement A is the shortest.

The calculating unit 604 has a function of executing various calculating processes. Specifically, the calculating unit 604 executes calculation processes for equations 1 to 4, thereby enabling the share ratios, actual advertisement charges, contract fulfillment ratios, and penalty charges depicted in FIG. 4 to be calculated for each advertisement.

As depicted in FIG. 6, the transmitting unit 603 has a function of transmitting a display schedule generated by the generating unit 602 to the advertisement displaying apparatus 102. Advertisement data may be distributed together with the display schedule or may be distributed in advance to the advertisement displaying apparatus 102.

The receiving unit 605 has a function of receiving a count result transmitted from the advertisement displaying apparatus 102. The count result is a display frequency of an advertisement displayed by the advertisement displaying apparatus 102. The updating unit 606 updates the display frequency stored in the DB 110, using the received count result. In response to this display frequency updating, the calculating unit 604 recalculates, for each advertisement, the share ratio, actual advertisement charge, contract fulfillment ratio, and penalty charge and overwrites data in the DB 110 with the recalculated result.

A functional configuration of the advertisement displaying apparatus 102 will be described. The advertisement displaying apparatus 102 includes a receiving unit 611, a display control unit 612, a detecting unit 613, a counting unit 614, and a transmitting unit 615. Respective functions of the units are implemented by an execution of a program by a CPU or operation of an I/F, the program being stored in a storage area as such the memory or an HD.

The receiving unit 611 has a function of receiving a display schedule transmitted from the advertisement managing apparatus 101. The receiving unit 611 also receives advertisement data when the advertisement data is transmitted with the display schedule. The detecting unit 613 detects external input. Specifically, the detecting unit 613 receives a detection signal from the sensor 202 to detect a viewer who is approaching or is in close proximity. Similarly, the detecting unit 613 receives a detection signal indicating that the operation area 302 has been touched to thereby detect the designation of a thumbnail image by the viewer.

The display control unit 612 has a function of controlling the display 201 to display an advertisement. Specifically, the display control unit 612 displays an advertisement by the push-type display process according to a received display schedule. When the detecting unit 613 detects a person during the push-type display process, the display control unit 612 switches the mode of the display 201 over to the guidance panel mode depicted in section (b) of FIG. 3. As depicted in section (c) of FIG. 3, when the detecting unit 613 detects specification of a thumbnail image, the display control unit 612 displays, in the pull-type display area 303, advertisement data of the advertisement corresponding to the specified thumbnail image.

The counting unit 614 has a function of counting the display frequency of an advertisement displayed by the display control unit 612. Specifically, the counting unit 614 separately counts the display frequency in the push-type full display area 301, the display frequency in the push-type reduced display area 304, and the display frequency in the pull-type display area 303. Count results are sent at a given timing to the transmitting unit 615, and count values are reset.

The transmitting unit 615 has a function of transmitting count results obtained by the counting unit 614 to the advertisement managing apparatus 101. Through this function, display frequencies stored in the DB 110 of the advertisement managing apparatus 101 are updated.

The advertisement displaying apparatus 102 may be provided with some of the functional units 601 to 606 and the DB 110 of the advertisement managing apparatus 101. When functioning as a stand-alone apparatus, particularly, the advertisement displaying apparatus 102 is provide with all the functional units 601 to 606 and the DB 110 of the advertisement managing apparatus 101.

Figure 8:
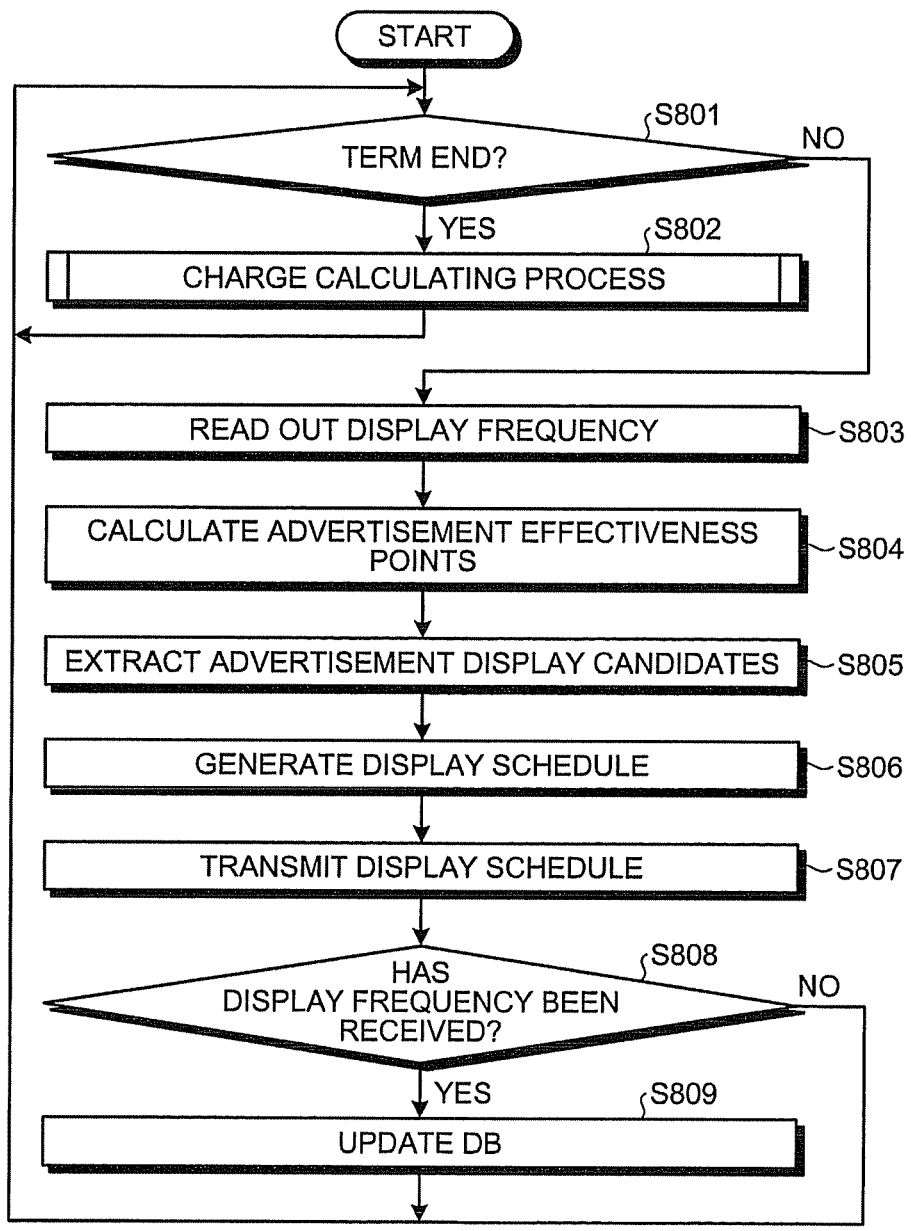
FIG. 8 is a flowchart of an advertisement management procedure by the advertisement managing apparatus of the embodiment.

FIG. 8 is a flowchart of an advertisement management procedure by the advertisement managing apparatus 101 of the embodiment. As depicted in FIG. 8, whether the current date is the term end is determined (step S801). The term end is the last day of a given term. When the current date is the term end (step S801: YES), the calculating unit 604 executes a charge calculating process (step S802), and the procedure returns to step S801.

When the current date is not the term end (step S801: NO), a display frequency of each advertisement is read out from the DB 110 (step S803). An advertisement effectiveness point is then calculated (step S804). The calculated advertisement effectiveness point is used to overwrite data in the DB 110. Subsequently, the extracting unit 601 extracts advertisement display candidates (step S805). The generating unit 602 then generates a display schedule (step S806), and the transmitting unit 603 transmits the display schedule to the advertisement displaying apparatus 102 (step S807).

Following this, whether a display frequency (count result by the counting unit 614 of the advertisement displaying apparatus 102) has been received is determined (step S808). If the display frequency has not been received (step S808: NO), the procedure returns to step S801. If the display frequency has been received (step S808: YES), the display frequency in the DB 110 is updated (step S809), and the procedure returns to step S801.

Figure 9:
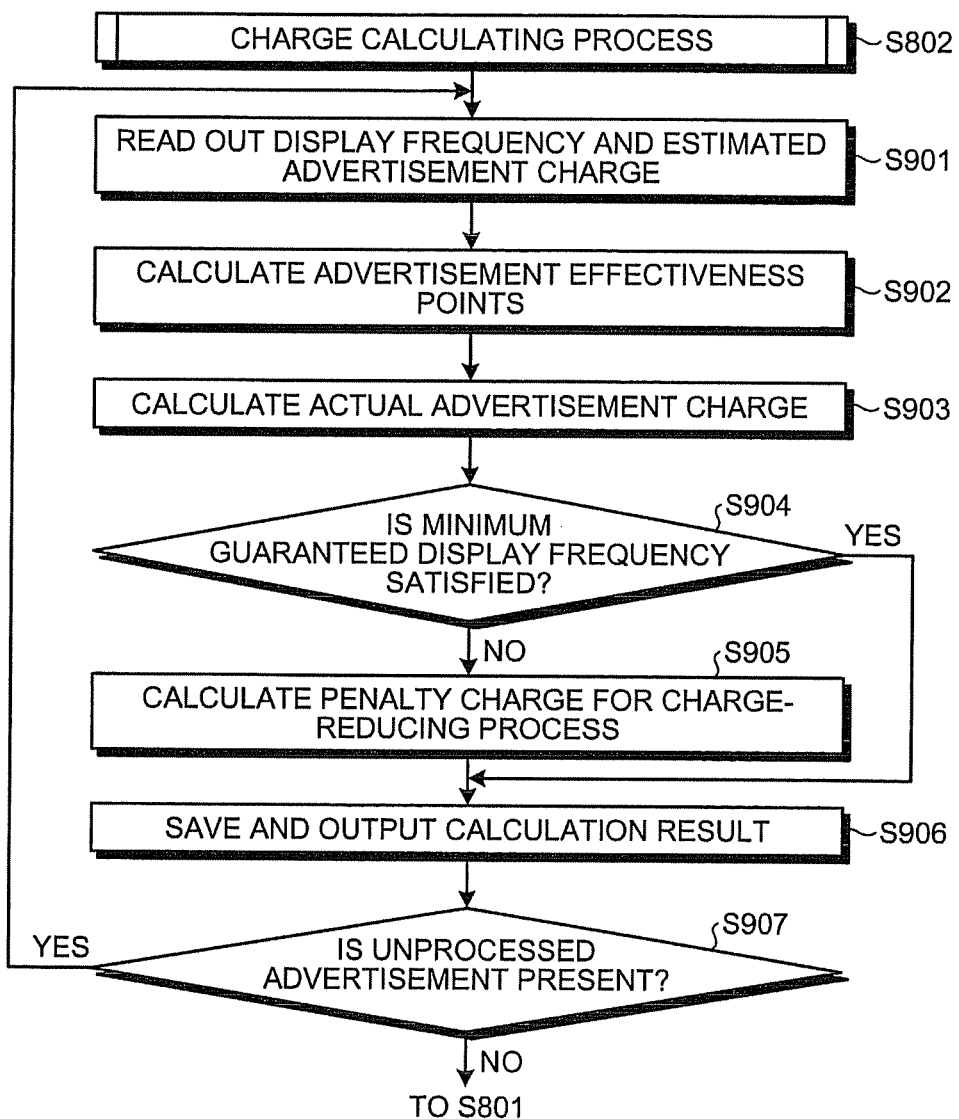
FIG. 9 is a flowchart of a detailed procedure of a charge calculating process depicted in FIG. 8.

FIG. 9 is a flowchart of a detailed procedure of the charge calculating process depicted in FIG. 8. As depicted in FIG. 9, in the execution of the charge calculating process, a display frequency and an estimated advertisement charge for an unprocessed advertisement are read out from the DB 110 (step S901) to calculate advertisement effectiveness points (step S902). An actual advertisement charge is then calculated (step S903).

Whether the minimum guaranteed display frequency has been satisfied is then determined (step S904). If the minimum guaranteed display frequency has been satisfied (step S904: YES), the procedure proceeds to step S906. If the minimum guaranteed display frequency has not been satisfied (step S904: NO), a penalty charge is calculated (step S905). At step S906, the result of penalty charge calculation is saved (used to overwrite data in the DB 110) and output (step S906).

Subsequently, whether an unprocessed advertisement is present is determined (step S907). If an unprocessed advertisement is present (step S907: YES), the procedure returns to step S901. If an unprocessed advertisement is not present (step S907: NO), the procedure proceeds to step S801.

Figure 10:
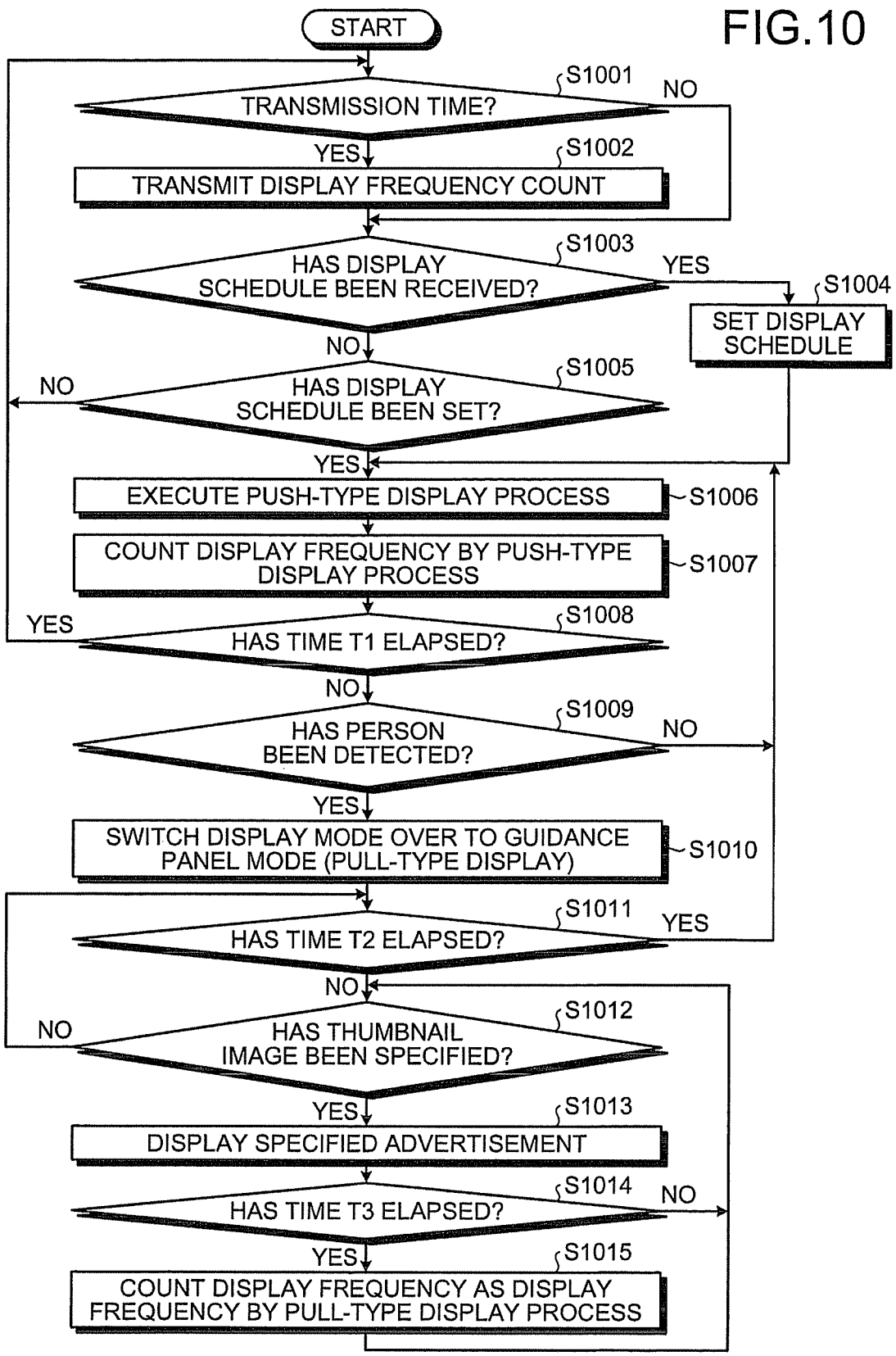
FIG. 10 is a flowchart of an advertisement display procedure by the advertisement displaying apparatus.

FIG. 10 is a flowchart of an advertisement display procedure by the advertisement displaying apparatus 102. As depicted in FIG. 10, whether the present time corresponds to a given transmission time is determined (step S1001). If the present time does not correspond to the transmission time (step S1001: NO), the procedure proceeds to step S1003. If the present time corresponds to the transmission time (step S1001: YES), a display frequency count (count result) is transmitted to the advertisement managing apparatus 101 (step S1002).

Whether a display schedule from the advertisement managing apparatus 101 has been received is determined (step S1003). If the display schedule has been received (step S1003: YES), the display schedule is set (step S1004), and the procedure proceeds to step S1006. If the display schedule has not been received (step S1003: NO), whether the display schedule has already been set is determined (step S1005).

If the display schedule has not been set (step S1005: NO), the procedure returns to step S1001. If the display schedule has been set (step S1005: YES), the display control unit 612 executes the push-type display process according to the set display schedule (step S1006).

The counting unit 614 then counts the display frequency of an advertisement by the push-type display process (step S1007). Subsequently, whether a given time T1 has elapsed from the start of the push-type display process is determined (step S1008). This given time T1 is the time that is set for confirming the transmission time and reception of the display schedule.

If the given time T1 has elapsed (step S1008: YES), the procedure returns to step S1001. If the given time T1 has not elapsed (step S1008: NO), whether the sensor 202 has detected a person is determined (step S1009). If a person has not been detected (step S1009: NO), the procedure returns to step S1006. If a person has been detected (step S1009: YES), the display mode is switched over to the guidance panel mode (step S1010).

Subsequently, whether a given time T2 has elapsed from the start of the guidance panel mode is determined (step S1011). The given time T2 is the time limit for switching the guidance panel mode (section (b) of FIG. 3) back to the advertisement display mode (section (a) of FIG. 3). If the given time T2 has elapsed (step S1011: YES), the procedure returns to step S1006, where the display mode is switched over to the advertisement display mode to execute the push-type display process.

If the given time T2 has not elapsed (step S1011: NO), whether a thumbnail image of an advertisement in the operation area 302 has been specified by a viewer before an elapse of the given time T2 is determined (step S1012). If a thumbnail image has not been specified (step S1012: NO), the procedure returns to step S1011.

If a thumbnail image of any one of the advertisements has been specified (step S1012: YES), advertisement data of the specified advertisement is displayed in the pull-type display area 303 (step S1013). Subsequently, whether a given time T3 has elapsed from the start of advertisement display in the pull-type display area 303 is determined (step S1014).

The given time T3 is approximately several seconds. If the given time T3 has not elapsed (step S1014: NO), the procedure returns to step S1012. If the given time T3 has elapsed (step S1014: YES), the display frequency of the advertisement being displayed is counted as the display frequency by the pull-type display process (step S1015).

An elapse of the given time T3 is given as a precondition for the counting at step S1015. This prevents counting of events having no advertisement effectiveness, such as the counting of mischievous repeated touches or a spell of unnecessary rapid touches on the operation area 302, and thus improves the reliability of the advertisement effectiveness.

In this manner, according to the embodiments, a push-type advertisement similar to a slide presentation is associated with a pull-type advertisement similar to a guidance panel so that a display layout and a display schedule are automatically determined to display an advertisement based on the contents of a contract made between an advertiser and an advertisement manager. Greater advertisement effectiveness is thus expected to be achieved.

Advertisement effectiveness is measured from multiple aspects, such as display frequency in the push-type display area, layout, and display frequency in the pull-type display area 303, and the ratio of shared advertisement expenses among advertisers is automatically determined based on the measured advertisement effectiveness, thereby enabling calculation of an actual advertisement charge close to the actual advertisement effectiveness.

Automatic switching between a push-type layout and a pull-type layout may be performed according to the location of a viewer to execute advertisement display that is extremely convenient for the viewer. In particular, an advertisement that is on full display at detection of the viewer is reduced in size, and is disposed at a distinctive position or is emphasized in a push-type reduced display list. This helps the approaching viewer to intuitively specify the advertisement that is on display at the detection of the viewer, and thus enables advertisement display offering greater convenience.

According to an aspect of the embodiments, a display schedule may be generated and distributed so that an advertisement having a low display frequency by the pull-type display process comes to have a high display frequency by the push-type display process.

Further, a layout of the display screen may be automatically switched from a push-type layout to a pull-type layout in response to detection of a viewer.

Additionally, the viewer is prompted to specify an advertisement that the viewer desires to see and know.

According to an aspect of the embodiments, a display schedule may be generated to satisfy a minimum guaranteed display frequency.

Further, the display schedule may be edited automatically.

According to an aspect of the embodiments, an advertisement effectiveness point may be adjusted through the push-type layout.

Furthermore, a charge corresponding to the effectiveness of an advertisement may be calculated.

As described above, according to the embodiment of the present invention, convenience for the viewer and reliability for the advertiser is improved to carry out balanced advertisement.

The methods explained in the present embodiments may be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program may be distributed through a network such as the Internet.

The advertisement managing apparatus 101 and the advertisement displaying apparatus 102 described in the present embodiments may be realized by an application specific integrated circuit (ASIC) such as a standard cell or a structured ASIC, or a programmable logic device (PLD) such as a field-programmable gate array (FPGA). Specifically, for example, functional units of advertisement managing apparatus 101 and the advertisement displaying apparatus 102 are defined in hardware description language (HDL), which is logically synthesized and applied to the ASIC, the PLD, etc., thereby enabling manufacture of the advertisement managing apparatus 101 and the advertisement displaying apparatus 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An advertisement providing system comprising:
a memory to store a plurality of advertisements;
a sensor; and
a display controller to
  display the advertisements on a display, according to a display schedule;
  display on the display, an advertisement designated by a viewer, from among the advertisements;
  count, for each of the advertisements, a first frequency of display at which the advertisement is displayed on the display according to the advertisement designated by the viewer and a second frequency of display at which the advertisement is displayed on the display according to the display schedule;
  generate, based on the first frequency of display and the second frequency of display and for each of the advertisements, the display schedule for the advertisements; and
  when the viewer is detected by the sensor, display on the display a layout while waiting for designation of a display candidate by the viewer.

2. The advertisement providing system according to claim 1, wherein
the display controller displays the advertisement being displayed on the display according to a display schedule when the viewer is detected, to be in a conspicuous position relative to other advertisements or to be accentuated relative to the other advertisements.

3. The advertisement providing system according to claim 1 wherein the display controller, based on the frequency of display for each of the advertisements and minimum guaranteed display frequency information for the advertisements, extract from the memory, an advertisement as a display candidate, and
generates a display schedule for the extracted advertisement.

4. The advertisement providing system according to claim 1 wherein the display controller extract as a display candidate and from the memory, an advertisement having a display frequency below a minimum guaranteed display frequency, and generate a display schedule for the extracted advertisement.

5. The advertisement providing system according to claim 1, wherein the display controller, based on the display frequency of an advertisement that is a display candidate, set a display order to generate the display schedule.

6. The advertisement providing system according to claim 1, wherein the display controller, based on the display frequency of an advertisement that is a display candidate, set a display period to generate the display schedule.

7. The advertisement providing system according to claim 1, wherein the display controller calculate for each advertisement, an advertisement effectiveness point, based on a point determined by weighting the first frequency of display with a first weight factor, and a point determined by weighting the second frequency of display with a second weight factor that is smaller than the first weight, and based on the advertisement effectiveness points, generate the display schedule for the advertisements.

8. The advertisement providing system according to claim 7, wherein various types of the second weight factor are set according to the size of a display area on the display.

9. The advertisement providing system according to claim 7, wherein various types of the second weight factor are set according to a distance from a given position on the display.

10. The advertisement providing system according to claim 7, wherein the display controller, based on the advertisement effectiveness point for an advertisement that is a display candidate, set a display order to generate the display schedule.

11. The advertisement providing system according to claim 1 wherein the display controller based on a total projected advertising charge for the advertisements collectively, a total display frequency of the advertisements collectively and the display frequencies for the each of the advertisements, calculate an actual advertisement charge for each of the advertisements.

12. A non-transitory computer-readable recording medium storing therein an advertisement displaying program that causes a computer to execute:
counting frequency of display on a display for an advertisement designated by a viewer, from among a plurality of advertisements stored in a storage unit; and
generating, based on the frequency of display for each of the advertisements, a display schedule for displaying the advertisements on the display; and
switching between a push-type display mode of displaying the advertisements on the display according to the display schedule and a pull-type display mode of displaying on the display, the advertisement designated by the viewer.

13. The non-transitory computer-readable recording medium according to claim 12 and storing therein the advertisement displaying program that further causes a computer to execute:
    transmitting the display schedule to an advertisement display apparatus.

14. The non-transitory computer-readable recording medium according to claim 12 and storing therein the advertisement displaying program that further causes a computer to execute:
    displaying the advertisement being displayed on the display according to the display schedule when the viewer is detected, to be in a conspicuous position relative to other advertisements or to be accentuated relative to the other advertisements.

15. An advertisement providing method comprising:
    displaying on a display, an advertisement designated by a viewer, from among a plurality of advertisements stored in a storage unit;
    displaying the advertisements on the display, according to a display schedule;
    counting, for each of the advertisements, a first frequency of display in a pull-type display mode of displaying on the display, the advertisement designated by the viewer and a second frequency of display in a push-type display mode of displaying the advertisements on the display according to the display schedule;
    generating, based on the first frequency of display and the second frequency of display and for each of the advertisements, the display schedule for the advertisements; and
    switching between the push-type display mode of displaying the advertisements on the display according to the display schedule and the pull-type display mode of displaying on the display, the advertisement designated by the viewer.

16. The advertisement providing method according to claim 15 and further comprising:
    displaying the advertisement being displayed on the display according to the display schedule when the viewer is detected by a detecting unit, to be in a conspicuous position relative to other advertisements or to be accentuated relative to the other advertisements.

17. The advertisement providing method according to claim 15, wherein
    the advertisement providing method further comprising:
    calculating, for each advertisement, an advertisement effectiveness point, based on a point determined by weighting the first frequency of display with a first weight factor, and a point determined by weighting the second frequency of display with a second weight factor that is smaller than the first weight, wherein
    the generating includes generating the display schedule for the advertisements, based on the advertisement effectiveness points.

18. An advertisement providing system comprising:
    a memory to store a plurality of advertisements
    a sensor; and
    a display controller to
        display the advertisements on a display, according to a display schedule;
        display on the display, an advertisement designated by a viewer, from among the advertisements;
        count, for each of the advertisements, a first frequency of display at which the advertisement is displayed on the display according to the advertisement designated by the viewer and a second frequency of display at which the advertisement is displayed on the display according to the display schedule;
        generate, based on the first frequency of display and the second frequency of display and for each of the advertisements, the display schedule for the advertisements; and
        when the viewer is detected by the sensor, display on the display a layout while waiting for designation of a display candidate by the viewer,
    wherein the display controller generates the display schedule based on a frequency of display of each advertisement calculated based on a first coefficient used for the first frequency of display and a second coefficient used for the second frequency of display, that differs from the first coefficient.

19. An advertisement display apparatus comprising:
    a display;
    a sensor; and
    a display controller that
        switches advertisement data displayed on the display according to time,
        displays, when a user to be detected is detected by the sensor, a plurality of thumbnails corresponding to the advertisement data,
        displays, when one of the thumbnails is selected, advertisement data corresponding to the thumbnail and a menu for the user to select any of pieces of information associated with the advertisement data,
        counts, for each of the advertisement data, a first frequency of display at which the advertisement data is displayed on the display according to the thumbnail selected by the viewer and a second frequency of display at which the advertisement data is displayed on the display according to the time, and
        generates, based on the first frequency of display and the second frequency of display and for each of the advertisement data, a display schedule for the advertisement data.

20. The advertisement display apparatus according to claim 19, wherein the thumbnails are arranged in an order in which the advertisement data corresponding to the thumbnails are displayed.

* * * * *

UNITED STATES PATENT AND TRADEMARK OFFICE
CERTIFICATE OF CORRECTION

| | | |
|---|---|---|
| PATENT NO. | : 8,881,188 B2 | Page 1 of 1 |
| APPLICATION NO. | : 12/604785 | |
| DATED | : November 4, 2014 | |
| INVENTOR(S) | : Kazumi Kubota et al. | |

It is certified that error appears in the above-identified patent and that said Letters Patent is hereby corrected as shown below:

On the Title Page

Column 2, Item [57] (Abstract), Line 1, After "system" insert -- which --.

Column 2, Item [57] (Abstract), Line 2, Delete "advertisements;" and insert -- advertisements, --, therefor.

In the Claims

Column 16, Line 2, Claim 18, delete "advertisement" and insert -- advertisement; --, therefor.

Signed and Sealed this
Twenty-fourth Day of February, 2015

Michelle K. Lee
*Deputy Director of the United States Patent and Trademark Office*